(12) United States Patent
Ledingham

(10) Patent No.: US 6,752,534 B2
(45) Date of Patent: *Jun. 22, 2004

(54) FLANGE BEARING HAVING REINFORCED MOLDED HOUSING

(75) Inventor: Stuart J. Ledingham, Coto de Caza, CA (US)

(73) Assignee: Valu Engineering, Inc., Rancho Santa Margarita, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 10/321,932

(22) Filed: Dec. 17, 2002

(65) Prior Publication Data

US 2003/0091252 A1 May 15, 2003

Related U.S. Application Data

(63) Continuation of application No. 09/427,281, filed on Oct. 26, 1999, now Pat. No. 6,493,939, which is a continuation of application No. 09/172,803, filed on Oct. 14, 1998, now Pat. No. 5,971,618, which is a continuation of application No. 08/655,040, filed on May 26, 1996, now abandoned.

(51) Int. Cl.[7] ............................................. F16C 27/02
(52) U.S. Cl. ...................................... 384/441; 384/220
(58) Field of Search ................................ 384/441, 215, 384/220, 536, 582

(56) References Cited

U.S. PATENT DOCUMENTS

| 1,977,876 A | 10/1934 | Groff |
| 2,672,070 A | 3/1954 | Forster |
| 3,446,542 A | 5/1969 | Whitehurst |
| 4,141,950 A | 2/1979 | Thompson |
| 4,677,721 A | 7/1987 | Kramer |
| 5,255,424 A | 10/1993 | Raines |
| 5,357,868 A | 10/1994 | Maas |
| 5,395,171 A | 3/1995 | Waskiewicz |
| 5,433,530 A | 7/1995 | Waskiewicz |
| 5,593,233 A | 1/1997 | Kammel et al. |
| 5,714,106 A | 2/1998 | Yoda et al. |
| 5,788,905 A | 8/1998 | Miller et al. |
| 5,836,702 A | 11/1998 | Whiddon et al. |
| 5,971,618 A | 10/1999 | Ledingham |
| 6,033,612 A | 3/2000 | Adams et al. |
| 6,089,758 A | 7/2000 | Ward |
| 6,200,513 B1 | 3/2001 | Emmett |

OTHER PUBLICATIONS

Nolu Plastics, Inc., "Engineered Plastic Shapes and Extrusions," Catalog 820, Flange Mountings, p. 25, dated unknown.
Valu Engineering, Inc., *Valu Guide®* Product Listing for LifeGard™ Flange Bearings, Oct., 1994.
Valu Engineering, Inc., *Valu Guide®* Marketing Guide No. 150 for LifeGard™ Bearings, Dec., 1994.
Valu Engineering, Inc., *Valu Guide®* New Product Bulletin for VG–525 Adjustable Leveler, May, 1994.
Valu Engineering, Inc. *Valu Guide®* Adjustable Levelers, pp. 1–4, 1995.

*Primary Examiner*—Lenard A Footland
(74) *Attorney, Agent, or Firm*—Knobbe, Martens, Olson & Bear LLP

(57) ABSTRACT

A flange bearing comprises a housing having a body with a reinforcing member encased therein. The housing provides strength and resistance to stress fracturing without the use of heavy materials, such as cast iron, or the use of ribs and recesses which can harbor contaminates. The bearing is preferably lightweight and easily cleaned. Also, a leveler constructed in accordance with the present invention provides similar advantages.

12 Claims, 3 Drawing Sheets

FLANGE BEARING HAVING REINFORCED MOLDED HOUSING

RELATED APPLICATIONS

This application is a continuation of copending application Ser. No. 09/427,281, filed Oct. 26, 1999 now U.S. Pat. No. 6,493,939, which is a continuation of application Ser. No. 09/172,803, filed Oct. 14, 1998, now U.S. Pat. No. 5,971,618, which is a continuation of application Ser. No. 08/655,040, filed May 26, 1996, now abandoned.

BACKGROUND OF THE INVENTION

The present invention relates generally to assembly lines and conveyor systems, and, in particular, to a flange bearing for supporting a rotatable shaft.

In manufacturing, assembly lines and conveyor systems commonly utilize flange bearings to support cylindrical shafts upon which manufactured products are transported. The bearings are mounted to a support structure which forms a track or bed along which the products are conveyed. Each shaft is received in a bearing insert of a housing for the flange bearing. The flange bearing might comprise a square housing mounted using four bolts, one at each corner. Alternatively, the flange bearing might comprise an eye-shaped housing utilizing two bolts for mounting.

Cast iron was the common material used for manufacturing early flange bearing housings which were mounted by either two or four bolts. A solid body was formed which easily withstood the stresses imparted by the heavy and/or cyclic loads from the shaft supported therein. Further, the cast iron housing was usually either metal-plated or painted to resist corrosion from exposure to water, cleaning chemicals, spilled products or other contaminates, especially in the food processing industry. However, the housing exterior would eventually deteriorate or become unsightly, especially since stringent cleaning was required to meet sanitation specifications in the aforementioned industry.

A more recent type of flange bearing comprises an injection-molded plastic housing. In particular, if the housing is injection molded in the form of solid plastic, the housing would disadvantageously shrink and deform unpredictably upon cooling. In order to provide an injection-molded housing of the equivalent strength of cast iron with repeatable dimensional stability, it is necessary to increase the overall geometry slightly for strength and incorporate a ribbed structure for dimensional stability. the result is an "engineered plastic" housing providing the desired positional geometry incorporating ribs and cavities. In an engineered plastic housing, the ribs provide strengthening to resist stress fractures of the housing from the shaft loading, while maintaining the desired shape during the molding process.

In addition, the cavities of the engineered plastic housing are more difficult and time consuming to clean satisfactorily than a solid body housing. Plugs created to fill the cavities, thereby making cleaning easier, tend to settle after time and during temperature changes so that the outer surface of the housing body is no longer flush, and the same cleaning difficulties remain. Plugs are often made of a different material than the housing and consequently expand and contract at a different rate than the housing causing undesirable cracks, crevices and uneven surfaces.

In view of the foregoing, a need exists for an improved bearing housing that overcomes the problems mentioned.

SUMMARY OF THE INVENTION

The present invention overcomes the aforenoted disadvantages by providing a housing having a lightweight, substantially solid body including an encased reinforcing member. This member provides additional strength and aids in transmitting loads from a shaft supported by the housing radially outwardly to fasteners which are used to mount the housing. The body does not have recesses formed on its mounting surface which could harbor contaminates, and therefore thorough cleaning of the housing is made easy.

The reinforcing member is preferably a loop formed from a band of metal which surrounds the bolt holes and shaft opening of the housing. Ends of the metallic band may be fastened using a screw engaged through holes on the band ends. Alternatively, the band ends may be spot-welded together, or the band may be formed in a continuous loop. In another embodiment, the reinforcing member may comprise one or more substantially straight metallic strips encased within the body material.

An important feature of the present invention is the use of the reinforcing member to provide additional strength to a lightweight body. Stress fractures from heavy and/or cyclic loading from a shaft supported by the housing are less likely to occur as a result of the presence of the reinforcing member in the body. The member may be suspended within the housing material and helps provide transmission of the loading radially outwardly from the shaft to the fasteners.

Another important feature of the present invention is the formation of a substantially solid body which does not include recesses or cavities for the accumulation of dirt, grease or other contaminates. Thus, cleaning the housing to meet sanitation specifications is readily accomplished.

In one preferred embodiment, the housing comprises a generally parallelogram shaped flange bearing. Two bolts in holes in narrow portions of a housing body mount the bearing to a conveyor structure. A rotatable shaft is supported in a bearing insert received in an opening in the housing body. A cover is optionally placed over one end of the shaft to protect passersby and to warn of the moving part contained therein. Alternatively, the housing may comprise a substantially square flange bearing having four bolts for mounting.

A preferred method of manufacturing a reinforced housing of the present invention comprises the steps of:

a) preparing a mold for the housing including desired openings for receiving one or more fasteners and a shaft;

b) preparing a metallic band for insertion into a space of the mold, with the band forming a shape smaller than the mold's outer shape;

c) suspending the band within the mold;

d) pouring a thermosetting material into the mold to encase the band; and e) cooling the material thereby creating a substantially solid yet lightweight body reinforced by the band contained within. In this method, Step b) may comprise using a screw engaged through holes in the ends of the band which is shaped into a loop. Alternatively, Steps b) and c) may comprise suspending one or more substantially straight metallic strips in the space of the mold as the reinforcing members, instead of a loop.

Further advantages and applications will become apparent to those skilled in the art from the following detailed description and the drawings referenced herein.

BRIEF DESCRIPTION OF THE DRAWINGS

FIG. 6 is an alternative cross-sectional view of the reinforcing member taken along line 6—6 in FIG. 3a;

DETAILED DESCRIPTION OF THE PREFERRED EMBODIMENTS

Most modern manufacturing facilities rely heavily upon conveyor systems which transport products through the various manufacturing procedures along a predetermined path. The manufacturing environment includes exposure of manufacturing and conveyor equipment to various fluids, dust, material debris and other contaminates. The fluids may include lubricants and/or liquid products. The material debris may be metal, plastic or food particles. Dirt or even bacteria may be present in the manufacturing facility and must be satisfactorily removed for product quality assurance, particularly in the food processing industry which maintains high sanitation standards.

Figure 1:
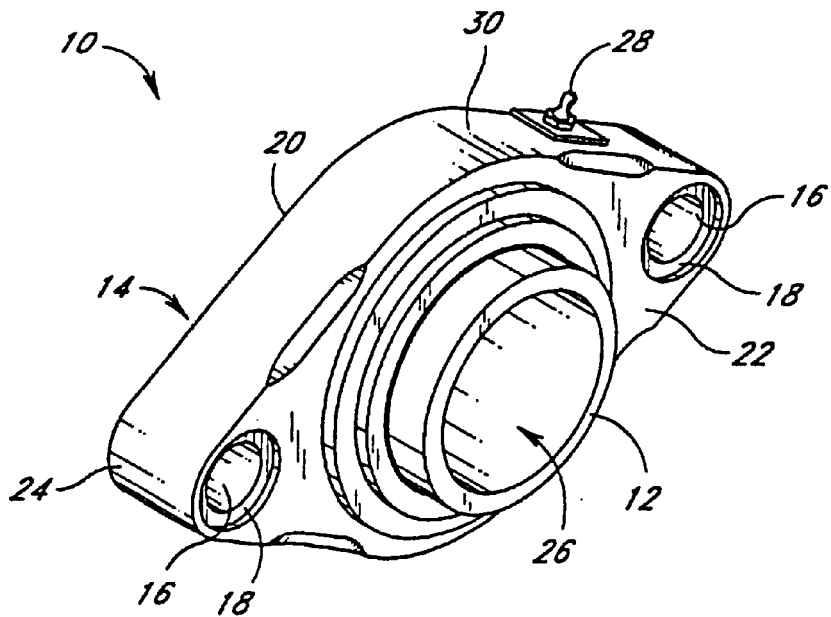
FIG. 1 is a front perspective view of a preferred flange bearing embodiment having a housing constructed in accordance with the present invention.

A preferred embodiment comprising a two bolt flange bearing 10 constructed in accordance with the present invention is shown in FIG. 1 and is used in conveyor systems to support a shaft (not shown) as will be readily understood by those of skill in the art. The shaft is preferably supported within a bearing insert 12 positioned in a housing 14 between holes 16 for mounting of the bearing 10 to a conveyor structure (not shown). The bearing insert 12 is typically a lubricated ball bearing. The shaft diameters may range from about ¾ inches to about 3 inches. Mounting bolts (not shown) received in the holes 16 of bolt sleeves 18 are generally about 5/16 inches to about ¾ inches in diameter.

A substantially flat or planar mounting surface 20 of the bearing 10 may be formed on a distal side of the housing 14, and a non-planar surface 22 may be formed on a proximal side of a substantially solid body 24 of the housing 14. The mounting surface 20 generally forms an eye shape or parallelogram having rounded corners, with the bolt sleeves 18 and mounting holes 16 positioned within acute corners and an opening 26 for the bearing insert 12 positioned within obtuse corners of the parallelogram. A screw and grease inlet orifice 28 are preferably provided at a side wall 30 of the housing 14 for lubrication of the bearing as required. Although a two bolt flange bearing is shown and described herein, it is understood that a four bolt and other flange bearing designs are possible in the present invention.

For protection against contaminates contributing to bearing failure, covers and seals (not shown) may optionally be placed at the bearing insert 12, over the end of the shaft as will be understood by those of skill in the art. Brightly colored covers also provide visual warning that a moving part is contained within. These seals may include a back shaft seal positioned between the distal surface 20 of the housing 14 and the mounting wall of the conveyor structure, as well as an O-ring and front shaft seal positioned between the open or closed cover and a proximal surface 31 of the housing 14.

Figure 2:
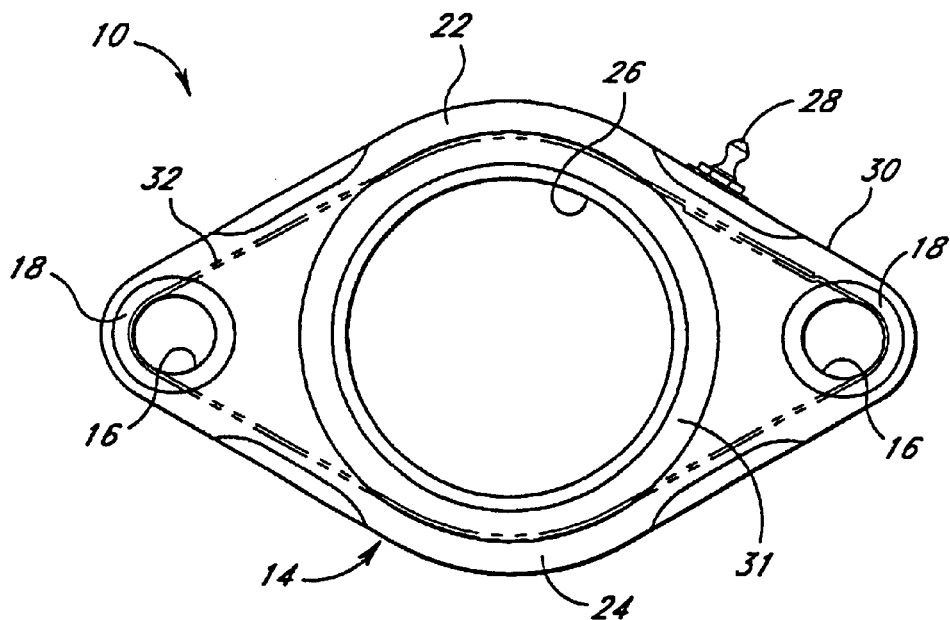
FIG. 2 is a top plan view of the housing of FIG. 1, with a reinforcing member shown in phantom.

FIG. 2 shows the housing 14 with a reinforcing member 32 illustrated in phantom. The member 32 is preferably encased within the material of the body 24 in the present invention and preferably comprises a loop formed by a metallic strip or band. The material of the housing body 24 is preferably urethane, although other pourable, thermosetting materials may alternatively be used to form the housing body 24. In the preferred embodiment, the urethane is poured or pumped into a female cavity within which is suspended the reinforcing member 32.

The housing 14 for the two bolt flange bearing 10 is preferably of standard dimensions, and for supporting a shaft of either 1 3/16 or 1 ¼ inches in diameter the housing 14 measures approximately 5.56 inches at the widest part and 3.31 inches perpendicular to the widest part. The distance between centers of the holes 16 is about 4.59 inches, and the bearing insert opening 26 is about 2.44 inches in diameter. The distance between the mounting and proximal surfaces 20, 22 of the housing 14 is about 0.89 inches.

Figure 3A:
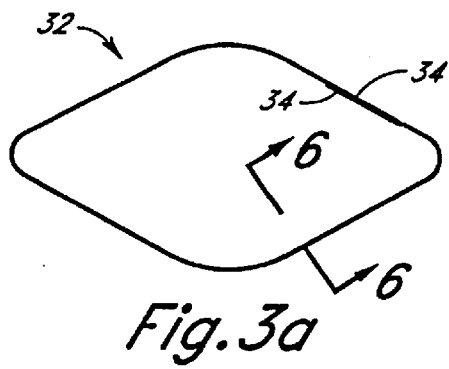
FIG. 3a is a top plan view of the reinforcing member.
Figure 3B:
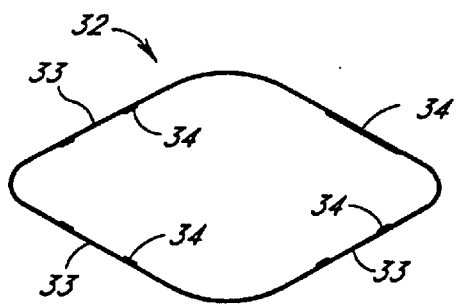
FIG. 3b is a top plan view of the reinforcing member comprising multiple strips.

The loop of the metallic band 32 generally conforms to a parallelogram shape, as shown in FIG. 3, and is somewhat smaller than the shape of the bearing's mounting surface 20. The metallic band 32 is preferably positioned to circumscribe the mounting holes 16 and bearing insert opening 26. The loop 32 preferably measures about 5.21 inches at its widest part and about 2.86 inches measured perpendicular to the widest part. The radius of curvature at about the bearing insert position is about 1.40 inches, and the radius of curvature at about the mounting holes 16 is about 0.279 inches. The reinforcing member 32 is preferably 300 series stainless steel, 16 or 20 gage.

Figure 4:
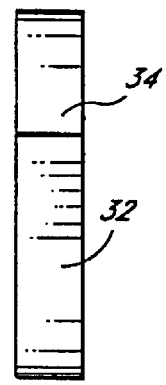
FIG. 4 is a side elevational view of the reinforcing member.
Figure 5:
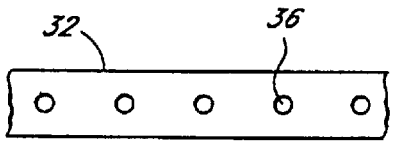
FIG. 5 is a detail view of overlapped ends of the reinforcing member having holes.

The metallic band 32 may be formed as a continuous loop, or the loop may be created by fastening together ends 34 of the band 32. FIGS. 4 and 5 show side views of the band 32, with the latter showing holes 36 provided near the band ends 34 for receiving a fastener. In this embodiment, an overlap of about one inch is provided at the band ends 34 and a screw (not shown) is received through the holes 36 of each end 34 while the band 32 is suspended within the housing mold and the poured urethane cools and sets during the manufacturing of the housing 14. Alternatively, the ends 34 of the band 32 may be welded together as will be easily understood by those of skill in the art.

Figure 6:
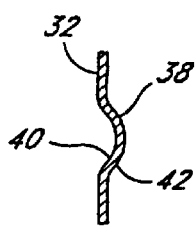

In another preferred embodiment, the metallic band 32 includes a longitudinal central portion 38 having an arcuate cross-section, shown in FIG. 6. The curvature is such that an inner surface 40 of the central portion 38, toward the bearing insert 12, is concave, and an outer surface 42, toward the side walls 30 of the housing 14, is convex. The band 32 has a total width of about ⅝ inches, and the central portion 38 has a radius of curvature of approximately 0.13 inches such that the band 32 measures about 3/16 inches from an innermost point to an outermost point of the central portion 38 of the band 32.

The load capacity of the two bolt flange bearing housing 14 is preferably up to about 1,710 lbs. The housing load capacity for a four bolt flange bearing constructed in accordance with the present invention is preferably up to about 3,640 lbs. The central portion 38 is preferably curved as described (FIG. 6) to assist the transmission of the loads radially outward from the shaft to the mounting bolts.

However, flat bands not having a curved central portion 38, as shown in FIGS. 2–4, may alternatively be used without loss of the advantages of the present invention. Further, in alternate embodiments, one or more substantially straight metallic bars or strips may be used as reinforcing members for the housing body. The strip(s) are preferably positioned along the longest portion(s) of the housing body 24. Thus, the reinforcing member 32 of the present invention is not limited to a loop shape but may comprise element(s) not conforming to the general outer shape of the housing body 24.

Figure 7A:
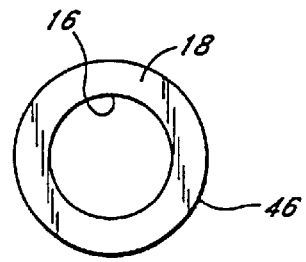
FIG. 7a is a top plan view of a bolt sleeve for the housing of FIG. 1.
Figure 7B:
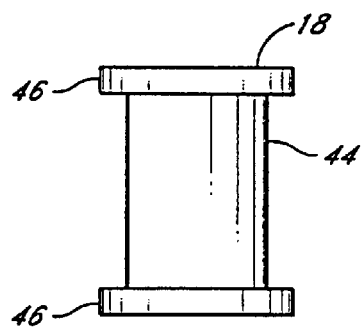
FIG. 7b is a side elevational view of the bolt sleeve.

FIGS. 7a and 7b show the sleeve 18 which is received in the housing 14 and forms the hole 16 for the mounting bolt (not shown). The sleeve 18 is substantially cylindrical and may have an exterior grooved portion 44. The outer diameter at ends 46 of the sleeve 18 is about 0.63 inches, and the outer diameter at the grooved portion 44 is about 0.56 inches. The inner diameter of the sleeve 18 is about 0.44 inches and the sleeve length is about 0.75 inches.

Figure 8:
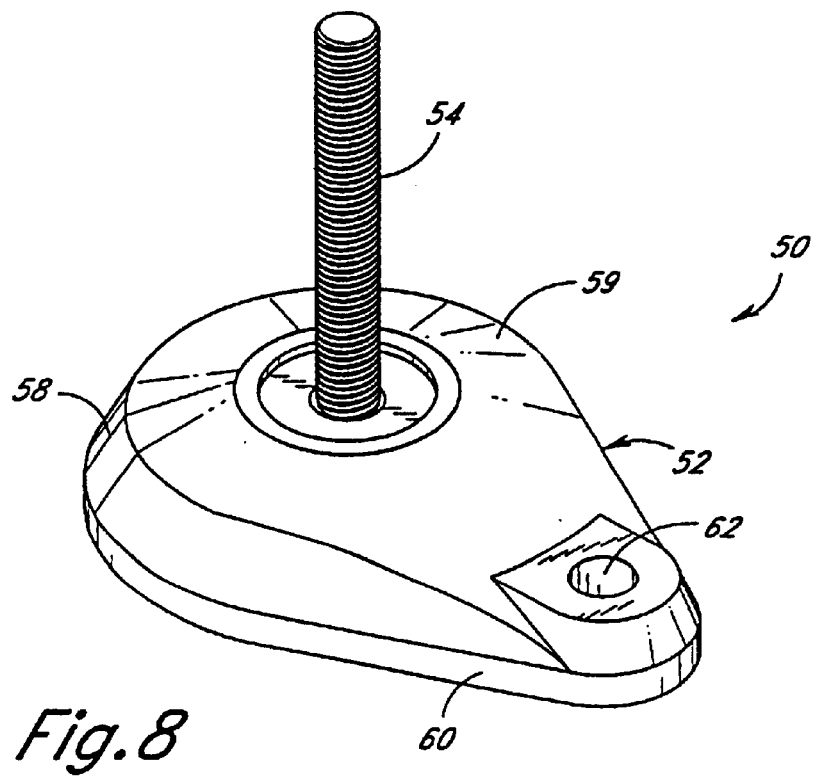
FIG. 8 is a perspective view of an alternate embodiment of the present invention.

Referring to FIG. 8, levelers are used for various machinery and have problems similar to those mentioned above for the flange bearing 10. Levelers are used on the bottom ends of the legs of a machine to adjust or level the machine height. However, adequate cleaning and disinfecting is greatly complicated by the presence of recesses, cavities, apertures and the like in the leveler housing.

In another embodiment of the present invention, FIG. 8 shows a leveler 50 comprising a somewhat teardrop shaped foot or housing 52 for supporting a machine (not shown) at an adjustable height. A threaded steel stem or shaft 54 is preferably received in an opening 56 in a broad portion 58 of a housing body 59, and a narrow portion 60 of the body 59 preferably has a hole 62 to receive a bolt (not shown) for mounting the foot 52 to the floor or other surface. The hole 62 is preferably offset a distance away from the shaft opening 56 in order to accommodate a drill or other tool used for securing the bolt to the floor. The shaft 54 is received in a leg of the machine, and the machine height is adjusted by rotation of the shaft 54.

Figure 9:
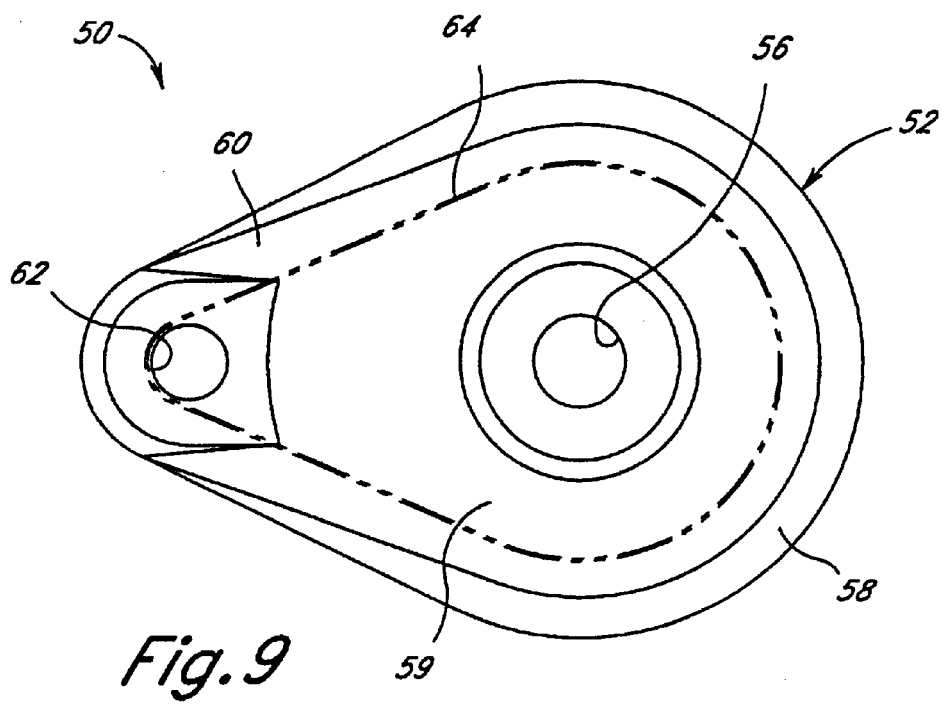
FIG. 9 is a top plan view of the embodiment of FIG. 8 with a reinforcing member shown in phantom.

The top plan view of FIG. 9 shows the teardrop shaped housing 52 having a reinforcing member 64 in phantom. It is understood, however, by those skilled in the art that other shapes for the leveler housing 52 are available and may be used in the present invention. The reinforcing member 64 preferably comprises a metallic band forming a loop which generally conforms to the outer shape of the housing 52. The use of the reinforcing member 64 adds strength to resist upward pulling loads applied to the housing 52 which preferably has a smooth underside without cavities (not shown).

The housing 52 preferably measures about 5.5 inches at the, widest part, and a distance of about 2.75 inches separates the lag hole 62 for receiving the bolt and the shaft opening. The narrow portion 60 of the housing 52 is about 0.73 inches thick, and the broad portion 58 of the housing 52 is about 1.10 inches thick.

The shaft 54 is preferably about 7.25 inches long and may have a diameter of about ¾ inches to about 1¼ inches. The shaft 54 may optionally be zinc-plated. Wrench flats (not shown) are typically provided at about 1¼ inches from the distal end of the shaft 54 which is received in the housing opening 56, to facilitate the leveler height adjustment by rotating the shaft 54 at the flats.

The metallic band 64 preferably forms a loop having a maximum diameter of at least 3⅝ inches. The band 64 preferably has a width no greater than about 0.7 inches. The band 64 may be flat or have a curved central portion as described herein. The band 64 may comprise fastened loop ends or be continuously formed. Alternatively, the reinforcing member 64 may comprise one or a plurality of substantially straight metallic strips for assisting the load transmission from the shaft 54 to the bolt. The member 64 is preferably suspended within a poured urethane material. Preferably, the load capacity of the leveler housing 52 is up to about 7,200 lbs.

A preferred method of manufacturing a housing 14, 52 constructed in accordance with the present invention comprises the steps of:

a) preparing a mold for the housing 14, 52 including desired openings for receiving one or more fasteners and a shaft 54;

b) preparing a metallic band 32, 64 for insertion into a space in the mold, the band 32, 64 forming a shape smaller than the mold's cavity;

c) suspending the band 32, 64 within the mold;

d) introducing a thermosetting material into the mold to encase the band 32, 64; and e) cooling the material thereby creating a substantially solid yet lightweight body 24, 59 reinforced by the band 32, 64 contained within. In this method, Step b) preferably comprises using a screw engaged through holes 36 in ends 34 of the band 32, 64 to secure the band 32, 64 in a loop shape. Although, other methods of securing the band ends 34 may also be used as known to those of ordinary skill in the art. Steps b) and c) may alternatively comprise suspending one or more substantially straight metallic strips in the mold as the reinforcing members, instead of a loop. As will be readily understood by those of skill in the art, Step d) may be accomplished by a variety of methods including, but not limited to, pouring or pumping the thermosetting material into the mold.

The embodiments illustrated and described above are provided merely as examples of the present invention. Other changes and modifications can be made from the embodiments presented herein by those skilled in the art without departure from the spirit and scope of the invention, as defined by the appended claims.

What is claimed is:

1. An apparatus to support a shaft, said apparatus comprising:

a molded body having a first hole for receiving a bearing insert, and at least one flange with a second hole therethrough for receiving a fastener;

a reinforcing member molded in place and encased entirely within the body, the reinforcing member surrounding the first and second holes and having arcuate portions adjacent said holes, said reinforcing member strengthening said holes and aiding in transmitting loads from the shaft radially to the fastener.

2. The apparatus of claim 1, wherein said reinforcing member comprise a metallic band.

3. The apparatus of claim 2, wherein the metallic band comprises a plurality of segments.

4. The apparatus of claim 1, wherein said body is urethane.

5. The apparatus of claim 1, wherein the reinforcing member is a metal strip having edges with substantially smaller surface areas than faces therebetween, and wherein the reinforcing member is molded with in the housing such that the faces are adjacent the holes.

6. A flange bearing to support a rotatable shaft at a fixed location, comprising:

a solid, molded body without recesses in which contaminants may accumulate on said body;

at least one hole for receiving a fastener;

a circular opening extending between front and rear surfaces of said body, said opening being located adjacent said hole;

a bearing insert received in said opening for supporting a shaft; and a reinforcing member molded in place and encased entirely within said solid body, said reinforcing member circumscribing said hole and said opening, and having arcuate portions adjacent said hole, said reinforcing member strengthening said hole and aiding in transmitting loads from the shaft radially to the fastener.

7. The bearing of claim 6, wherein said body is urethane.

8. The bearing of claim 7, wherein said reinforcing member comprises a metallic strip.

9. The bearing of claim 7, wherein said reinforcing member comprises a plurality of metallic strip segments connected to form a closed loop.

10. The bearing of claim 9, wherein said strip segments are welded in end-to-end relation.

11. The bearing of claim 9, wherein said strip segments are fastened to one another in end-to-end relation using a band fastener.

12. The bearing of claim 7, wherein said reinforcing member has a lateral cross-section having arcuate portions joined by linear portions.

\* \* \* \* \*